United States Patent [19]

Robert et al.

[11] Patent Number: 4,665,480

[45] Date of Patent: May 12, 1987

[54] DATA PROCESSING SYSTEM WHICH PERMITS OF USING THE SAME ERASABLE AND PROGRAMMABLE MEMORY FOR INSTRUCTIONS AND DATA BOTH IN READING AND WRITING

[75] Inventors: Serge Robert, Jouy en Josas; Pierre Fevrier, Fontenay aux Roses, both of France

[73] Assignee: U.S. Philips Corporation, New York, N.Y.

[21] Appl. No.: 880,951

[22] Filed: Jun. 26, 1986

Related U.S. Application Data

[63] Continuation of Ser. No. 829,462, Feb. 12, 1986, abandoned, which is a continuation of Ser. No. 445,828, Dec. 1, 1982, abandoned.

[30] Foreign Application Priority Data

Dec. 2, 1981 [FR] France ............................... 81 22570

[51] Int. Cl.⁴ ............................................. G06F 13/00
[52] U.S. Cl. .................................................. 364/200
[58] Field of Search ... 364/200 MS File, 900 MS File

[56] References Cited

PUBLICATIONS

Cayton, "Designing with Nitride-Type EAROMs", Memory Design: Microcomputer to Mainframes, pp. 120–126, published 1978.

*Primary Examiner*—Thomas M. Heckler
*Attorney, Agent, or Firm*—Jack E. Haken; James J. Cannon, Jr.

[57] ABSTRACT

The data processing system according to the invention has a microprocessor and an external erasable and programmable memory. A logic connection system is arranged between control pins of the microprocessor and a controlled pin of the external memory. These control pins of the microprocessor are the program control pin, a port control pin, the controlled pin of the memory and the memory selection pin. This ligic connection system permits using only one memory both for reading and writing of instructions and/or data instead of the two memories generally used.

6 Claims, 5 Drawing Figures

4,665,480

DATA PROCESSING SYSTEM WHICH PERMITS OF USING THE SAME ERASABLE AND PROGRAMMABLE MEMORY FOR INSTRUCTIONS AND DATA BOTH IN READING AND WRITING

This is a continuation of application Ser. No. 829,462, filed Feb. 12, 1986, now abandoned, which was a continuation of Ser. No. 445,828, filed Dec. 1, 1982, now abandoned.

BACKGROUND OF THE INVENTION

1. Field of the Invention

The invention relates to a data processing system having an external memory and a microprocessor with an internal memory, the microprocessor and the external memory being connected to a bus, said microprocessor having a program control pin and at least one port control pin, said external memory having a memory selection pin.

2. Description of the Prior Art

Such data processing systems are generally used in a mini-computer. The external memory usually comprises a non-(RAM). The non volatile memory is used to store the instructions and data required for executing a program by the microprocessor. The volatile memory is used inter alia for processing data in reading and in writing during the execution of the program.

Mini-computers are being strongly developed because their possibility of automation of all kinds of processes, not only in applications fulfilling high technical requirements, but also in domestic applications, such as washing machines, electronic ignition and injection of vehicles, and in electronic funds transfer systems (terminals for electronic banking cards, designated as memory cards).

In most of the applications, a given speed is aimed at, therefore, external non-volatile memory and external volatile memory chip(s) are used in the ultimate apparatus.

During the initiation of the minicomputer, the external non-volatile memory chip(s) (ROM) containing the current program is often replaced by an erasable and programmable memory chip, which permits for changing the program it contains in dependence upon its initiation without the said erasable and programmable memory chip (called reprogrammable) becoming unusable.

As a result, the reprogrammable read-only memory in fact becomes a "random access" memory because its content can be erased and rewritten; however, the price of the reprogrammable read-only memories is higher than the price of the random access memories, which in turn is higher than that of the read-only memories.

According to the actual state of the art, the erasable and programmable, but non-volatile memory assumes the same reading and writing functions as a random access memory; their main differences are; the speed, the price and the volatility. A reprogrammable memory is more expensive than a random access memory and it operates approximately $10^5$ times more slowly for a writing process (10 msec against 100 nsec); the reprogrammable memory is permanent, whereas the random access memory is volatile.

The difference in speed cannot be disadvantageous functionally for given applications which do not require a high speed; on the contrary, during writing into the reprogrammable memory, the microprocessor has to wait for the end of the writing operations before it is able to continue the execution of the program; this waiting (10 msec) is achieved by means of instructions which have to be charged into the internal memory of the microprocessor. Consequently, the writing control pin of the microprocessor cannot be utilized because the duration of the signal supplied (100 nsec) is too short and cannot be supplied for a longer duration; consequently, one of the port control pins has to be utilized, but then a first difficulty arises; as a matter of fact, the controlled memory selection pin of the reprogrammable memory will have to be connected to two pins of the microprocessor, i.e. to the program control pin and to the port control pin; but it has to be avoided that these two control pins interfere with each other.

As a matter of fact, on the one hand, the program control pin is also connected to the controlled memory selection pin, and on the other hand the port control pin is often operated in multiplex, which means that while having several applications, it is also connected to other chips for controlling other functions; these other functions evidently need not be carried out simultaneously with the writing function in the reprogrammable memory.

SUMMARY OF THE INVENTION

The invention has for its object to provide a data processing system which comprises no longer two external physical memories, of which one is a volatile access memory and the other is a non-volatile memory, supporting the given logic and program functions, respectively, but only one physical reprogrammable memory supporting the two logic functions without the control signals emitted by the microprocessor interfering with each other.

According to the invention, a data processing system is characterized in that said external memory is an erasable and programmable memory said memory selection pin is connected to a first output of a logic connection system, this logic connection system having a first input connected to said program control pin and a second input connected to said port control pin, which logic connection system being arranged on the one hand for transmitting to its first output a signal present at its first input during an operation of reading the external memory controlled by the microprocessor and on the other hand for transmitting to its first output the signal present at its second input during an operation of writing in said external memory controlled by the microprocessor and stopping a propagation of said signal present at its second input to the first input.

The object of the invention is achieved in that the external memory is erasable and programmable and in that, due to the use of the logic conneciton system, the control signal emitted at the port control pin of the microprocessor does not interfere with the control signal emitted at the program control pin.

A first preferred embodiment of a data processing system according to the invention is particularly characterized in that the said external memory is an electrically erasable and programmable memory.

In order to reprogram an electrically erasable and programmable memory (designated as EEPROM), it is sufficient to use a voltage source supplying approximately 20 V. Such voltage sources can be readily incorporated in the system. Moreover, a memory of the EEPROM type provides all the desired flexibility because it is not volatile, as would be the case with a RAM, and because the microprocessor can erase electrically the content of an address already utilized previously before rewriting at the same address.

A second preferred embodiment of a data processing system according to the invention, in which the external memory includes and output contol pin, is particularly characterized in that the said logic connection system has a second output, which is connected to said first input for directly transmitting the signal present at this first input, the said output control pin of the external memory being connected to the said second output. Thus, a particularly simple and efficacious logic connection system is obtained, which can be used in an external memory which including an output control pin.

A third preferred embodiment of a data processing system according to the invention, in which the port control pin of the microprocessor can be utilized so as to be operated in a time multiplex mode at its output, is particularly characterized in that the said logic connection circuit is also arranged to prevent a signal present at its first input from interfering with the said second input. In the case in which the port control pin of the microprocessor is operated in time multiplex at its output, tht is to say that it is used for controlling at other instants other peripheral elements of the microprocessor, it is important that the signals not related to the writing operation in the external memory are not disturbed by the signal present at the said first input.

In another preferred embodiment, a data processing system according to the invention is particularly characterized in that the said logic connection system is constituted by a logic AND gate. Logic AND gates being commercially available at low cost, this embodiment is consequently very advantageous.

Another preferred embodiment of a data processing system according to the invention is particularly characterized in that the said logic connection system comprises at least two diodes arranged according to a wired AND. This embodiment can be readily realized in technical respect.

The invention is used preferably in an electronic funds transfer system because it permits of obtaining at low cost terminals for banking cards. In this application, the speed at which the data are processed is not primary.

It is known that there are two techniques for controlling the validation of an external memory:

1. The "TEXAS (INSTRUMENTS)" technique, which comprises only memory selection control pin (CS=chip select).

2. the "INTEL-ZILOG" technique, which comprises a memory selection control pin (CE=Chip Enable) and an output control pin (OE=Output Enable). The data processing system can be used in both techniques. The following description of the mode of operation relates to the "INTEL-ZILOG" technique, but this is not a limitation. For the use of the invention in the "Texas Instruments" technique it is sufficient to avoid to employ and hence to connect the output control (OE). The description of the mode of operation of the system is given in the form of a preferred embodiment having an external memory EEPROM, it being assumed that there is only one physical chip for the external memory and hence no address decoder which, could be inserted between the said first output and the memory selection pin.

The invention could also be used with a memory erasable with ultraviolet rays designated as EPROM), but the operation would be strongly adversely affected because it could be rewritten only once at a given address; as a matter of fact, the erasing by ultraviolet radiation that could be controlled by the microprocessor is a rough erasing of the whole memory, as a result of which the running program would be destroyed if it is assumed that there is only one memory chip.

BRIEF DESCRIPTION OF THE DRAWINGS

The invention will now be described more fully with reference to the accompanying drawing, in which.

DESCRIPTION OF THE PREFERRED EMBODIMENTS

Figure 1:
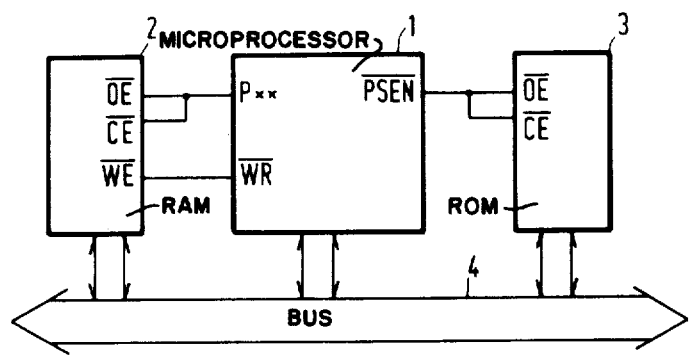
FIG. 1 shows the architecture of the main elements of a conventional data processing system.

In FIG. 1, those skilled in the art will readily recognize the conventional architecture of a data processing system, also designated as mini-computer, which comprises:

a BUS (4)

a microprocessor (1), for example, of the type 8048 of INTEL, a volatile memory (RAM) (2), for example, of the type 2141 of INTEL, a non-volatile memory (ROM) (3), for example, of the type 3236 of INTEL.

The program control pin ($\overline{PSEN}$) and a port control pin (Pxx) of the microprocessor (for example, the port P23) are connected directly to the controlled memory connection pin ($\overline{OE}$) and to the memory selection pin ($\overline{CE}$), respectively, of each non-volatile memory (ROM) and each volatile memory (RAM).

The writing control pin ($\overline{WR}$) of the microprocessor is connected to the controlled writing pin ($\overline{WE}$) of the volatile memory (RAM).

Figure 2:
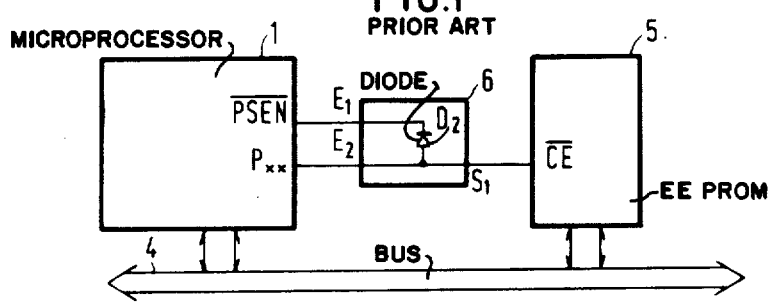
FIG. 2 shows an elementary embodiment of a data processing system according to the invention.
Figure 3:
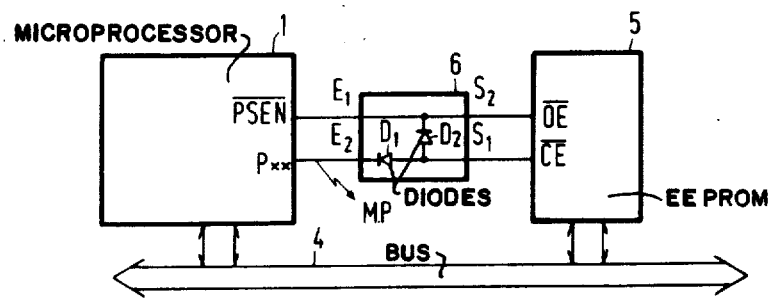
FIG. 3 shows a preferred embodiment of a data processing system according to the invention.

In FIGS. 2 and 3 there are only two physical chips:

a microprocessor (1), for example, of the type 8048 of INTEL, and erasable and programmable memory 5, preferably an electrically erasable and programmable memory, for example, of the EEPROM type 2816 of INTEL, as shown in FIG. 3.

The control pin ($\overline{WR}$) of the microprocessor is no longer utilized because its control signal has a duration which is too short for a memory of the EEPROM type according to the prior art.

In the embodiment of FIG. 2, the program control pin ($\overline{PSEN}$) of the microprocessor is directly connected to a first input $E_1$ of a logic connection system 6. A second input $E_2$ of the logic connection system 6 is connected to a control pin Pxx, for example, the port P23 of the microprocessor. A first output $S_1$ of the logic connection system is connected the controlled memory selection pin ($\overline{CE}$) of the erasable and programmable memory 5.

Figure 2A:
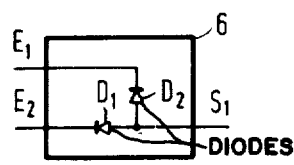
FIGS. 2a, 2b show modifications of the logic gate system.

The logic connection system 6 comprises, for example, a diode ($D_2$) which prevents a signal present at the port control Pxx from interfering with the program control PSEN at the level of the microprocessor. In FIG. 2a, the logic connection system comprises a second diode (D₁) which prevents a signal present at the first input E₁ from interfering with the second input E₂. The first diode and the second diode are arranged according to a wired AND. These diodes are, for example, of the type 7417 of Texas Instruments.

Figure 2B:
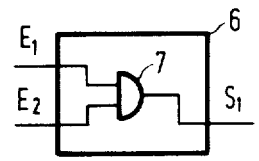

In FIG. 2b, the two diodes of FIG. 2a are replaced by a logic AND gate which fulfils the same function, for example a logic AND gate 7408 of Texas Instruments. The output of the logic AND gate is connected to the said first output of the logic connection system.

In the preferred embodiment shown in FIG. 3, the embodiment shown in FIG. 2a is used. The multiplex connections to other peripheral elements of the control pin Pxx is indicated symoblically by the arrow MP. The external memory (5) is an electrically erasable and programmable memory of the EEPROM type which has an output control pin (OE) connected to a second output S₂ of the logic connection system 6, which is in turn directly connected to the first input of the logic connection system.

It will be noted that the device according to the invention is very simple considering the low cost of the mini-computer thus obtained, albeit at the expense of a relatively slow operation of writing into the memory.

The mode of operation of the circuit diagram of FIG. 1 is in accordance with the two following truth tables: (a) for the external ROM (3):

TABLE I

| F | $\overline{PSEN}$ | $\overline{OE}$ | $\overline{CE}$ |
|---|---|---|---|
|  | BR |  |  |
| A | L | L | L |
| B | L | L | L |
| A.B | H | H | H |

In this Table I are indicated on the one hand the pins (BR) of controlling the microprocessor ($\overline{PSEN}$) and the controlled pins of the memory ($\overline{OE}$) and ($\overline{CE}$) and on the other hand the controlled functions (F):

either the reading (A) of an instruction to be executed (cycle Fetch)

or the reading (B) of data required for executing an instruction; the indication Low Level (L) and High Level (H) indicate the state of the electrical voltage means on the pins. ($\overline{A/}$) indicates that neither the function A nor the function B are active, that is to say there is no reading operation required by the microprocessor (($\overline{SPEN}$, high level (H)) for the non-volatile memory. When reading Table I, it is noted that, when the microprocessor fetches up (($\overline{PSEN}$, los level (L)) either an instruction or data stored in the non-volatile memory (3), the controlled pins of the non-volatile memory (3) ($\overline{OE}$) and ($\overline{CE}$) are held at their active level (=low level) so that this non-volatile memory is enabled to transmit the required information through the bus (4).

TABLE II

| F | Pxx | $\overline{WR}$ | $\overline{WE}$ | $\overline{OE}$ | $\overline{CE}$ |
|---|---|---|---|---|---|
|  |  | BR |  |  |  |
| B | L | H | H | L | L |
| C | L | L | L | L | L |
| B.C | H | X | X | H | H |

In this Table II are indicated on the one hand the control pins (BR) of the microprocessor (Pxx and $\overline{WR}$) and the controlled pins of the memory (2) ($\overline{WE}$, $\overline{OE}$ and $\overline{CE}$) and on the other hand the controlled functions (F)

either of reading (B) or of writing (C) data in the random access memory.

The expressions Low level (L) and High level (H) indicate the state of the electrical voltage which activates the desired function; the indication (X) means that the value of the voltage is indifferent.

The heading $\overline{B/}$ indicates that neither the function B nor the function C are active, that is to say that the microprocessor does not fetch up the memory (2), which also explains that the value of the voltage at the pins $\overline{WR}$ and $\overline{WE}$ can be indifferent during the function $\overline{B}./$ c) the mode of operation of the circuit diagram shown in FIGS. 2 and 3 according to the invention is effected in accordance with the following truth table (Table III):

| F | $\overline{PSEN}$ | Pxx | $\overline{OE}$ (FIG. 3) | $\overline{CE}$ | $\overline{PSEN}$ ∩ Pxx |
|---|---|---|---|---|---|
|  |  | BR |  |  |  |
| A | L | X | L | L | L |
| B | L | X | L | L | L |
| C | H | L | H | L | L |
| A.B.C | H | H | H | H | H |

The pins and the functions are the same as for Table I and II.

Taking into account that the pin $\overline{PSEN}$ of the microprocessor is directly connected to the pin $\overline{OE}$ (FIG. 3) of the memory of the EEPROM type, the signal of these two pins is identical, that is to say a low level during a reading operation (A,B) and a high level during a writing operation (C) or in the absence of an operation. The signal at the pin $\overline{CE}$ of the reprogrammable memory is obtained by applying the logic AND function to the signals $\overline{PSEN}$ and Pxx originating from the microprocessor, as indicated in Table III. The signal present at the pin $\overline{CE}$ of the reprogrammable memory has a low level (active level) for each operation both of reading and of writing in the memory 5. The indifference of the pin Pxx to the value of the voltage during a reading operation (A or B) is explained by the fact that the signal $\overline{PSEN}$ always has a low level during this reading operation.

The device being not specific for one or several addresses or for a memory section, the whole EEPROM memory is thus designated for two-way use and is available indifferently for reading and writing both of instructions and of data; besides the advantages already mentioned, it is possible to modify by a simple writing operation (C) the instructions of a program in accordance with the execution; the program becomes self-evolutive and this possibility causes a considerable increase of the possible applications of the minicomputer.

Electronic funds transfer systems generally comprise a terminal in which a client introduces his credit card. This terminal is generally part of a minicomputer. By using the terminal for credit cards, the speed at which the data is processed is not primordial. In fact a client will not notice a difference between 10 msec and 100 nsec required for writing into an external memory. This is even more justified if this time is compared with the time required by a client for introducing, by using a keyboard, the amount of money he wants. Therefore a data processing system according to the invention is most likely applicable to an electronic funds transfer systems which can thus be realized at low expenses.

What is claimed is:

1. A data processing system comprising a non-volatile external memory and a microprocessor with an internal memory, the microprocessor and the non-volatile external memory being connected to a bus, said microprocessor comprising a program control pin and at least one port control pin, said non-volatile external memory comprising a memory selection pin, characterized in that said external memory is an erasable and programmable memory said memory selection pin of which is connected to a first output of a logic connection system, this logic connection system having a first input connected to the said program control pin and a second input connected to one of said port control pins, which logic connection system being arranged on the one hand for transmitting to its first output a signal present at its first input during an operation of reading the non-volatile external memory controlled by the microprocessor and on the other hand for transmitting to its first output the signal present at its second input during an operation of writing in said non-volatile external memory controlled by the microprocessor and stopping a propagation of said signal present at its second input to the first input.

2. A data processing system as claimed in claim 1, characterized in that said non-volatile external memory is an electrically erasable and programmable memory.

3. A data processing system as claimed in claim 1, the non-volatile external memory of which comprises an output control pin, characterized in that the said logic connection system comprises a second output, which is connected to said first input for directly transmitting the signal present at said first input, said output control pin of the non-volatile external memory being connected to the said second output.

4. A data processing system as claimed in claim 1, the said port control pin of which can be utilized so as to be operated in a time multiplex mode at the output of said microprocessor, characterized in that said logic connection system is also arranged to prevent a signal present at its first input from interfering with said second input.

5. A data processing system as claimed in claim 1, characterized in that said logic connection system is constituted by a logic AND gate.

6. A data processing system as claimed in claim 4, characterized in that the said logic connection system comprises at least two diodes arranged according to a wired AND.

* * * * *